(12) United States Patent
Tronche et al.

(10) Patent No.: US 6,214,433 B1
(45) Date of Patent: Apr. 10, 2001

(54) RADIATION-CURABLE COATINGS FOR OPTICAL DISCS AND OPTICAL DISCS INCORPORATING SUCH COATINGS

(75) Inventors: Christopher F. Tronche, Schaumburg; Chau T. Ha, Arlington Heights, both of IL (US)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/411,492

(22) Filed: Oct. 4, 1999

(51) Int. Cl.[7] ........................................................ B32B 3/02
(52) U.S. Cl. ...................... 428/64.1; 428/64.2; 428/64.4; 428/64.8; 428/457; 428/913; 430/270.14; 430/495.1; 430/945; 369/283; 369/288
(58) Field of Search ................................... 428/64.1, 64.2, 428/64.4, 64.8, 457, 913; 430/270.14, 495.1, 945; 369/283, 288

(56) References Cited

U.S. PATENT DOCUMENTS

| | | | | |
|---|---|---|---|---|
| 6,080,483 | * | 6/2000 | Szum | 428/378 |
| 6,130,270 | * | 10/2000 | Ukon | 522/182 |
| 6,136,943 | * | 6/2000 | Kawashima | 528/111 |

* cited by examiner

Primary Examiner—Elizabeth Evans
(74) Attorney, Agent, or Firm—Leydig, Voit & Mayer, Ltd.

(57) ABSTRACT

Optical disc, e.g., CD-R, DVD, DVD-R, comprising a polymer substrate and a radiation-cured coating provided by curing a radiation-curable coating composition having a pH greater than or equal to 3 and comprising at least one acrylate monomer, and advantageously diacrylate monomers and oligomers and monomers having acrylate functionalities of from 1 to at least 3, wherein the optical disc exhibits jitter of no greater than about 35 ns after being subjected to an environment having a temperature of at least 80° C. and a relative humidity of at least 85% for a period of at least 96 hours.

32 Claims, 2 Drawing Sheets

RADIATION-CURABLE COATINGS FOR OPTICAL DISCS AND OPTICAL DISCS INCORPORATING SUCH COATINGS

FIELD OF THE INVENTION

The present invention relates to radiation-curable compositions useful as coatings on optical discs, and optical discs that include such cured compositions.

BACKGROUND OF THE INVENTION

In response to the demand for more reliable and higher capacity data storage and retrieval systems, considerable research and development is undertaken on optical disc systems. A primary component of the optical disc system is the optical disc. The optical disc is encoded with information, and serves as the storage component of data storage and retrieval systems. Optical discs are presently available in a variety of formats including, but not limited to, CD-DA (compact disc-digital audio which includes the common music CD), CD-ROM (compact disc-read only memory), CD-WORM (write-once-read-many), CD-R (compact disc-recordable) and DVD (digital versatile disc).

Generally, all optical discs include a substrate, a means for encoding data and a reflective layer. The substrate is typically a polycarbonate disc, with an opening for a spindle being provided in the center of the disc. The encoding of data on an optical disc, in what will be referred to herein as a data layer, can be accomplished in several ways, and in one or more data layers, depending on the desired format. For example, a CD-ROM encodes data directly on the substrate by providing a series of pits and lands on the substrate surface. In contrast, a CD-R utilizes a separate data encoding medium, e.g., a dye or other type of data encoding material that is separate and apart from the substrate, as its data layer.

A reflective layer is required because, as in all optical discs, the data layer is accessed using laser light. More specifically, and as is well known, the reflective layer of the optical discs, as the name implies, functions to reflect laser light onto a detector so the data can be retrieved and subsequently converted into a usable format. To provide the disc with this reflective capability, at least one extremely thin (50–500 nm) reflective metallic (e.g., gold, silver, copper, aluminum or other known reflective metallic alloy) material is deposited (e.g., sputtering, vacuum evaporation) over the data layer of the optical disc. During the data retrieval (reading) process, the laser focuses on and tracks the data located on the optical disc. Because the data layer affects the properties of the laser light, an appropriate detector is able to sense these property differences in the reflected laser light and convert them into a binary (1's and 0's) signal. The binary signal is then further processed to provide the desired output to the user.

The data layer of a DVD, like that of a CD-ROM, comprises a series of pits and lands embossed on the surface of the optical disc substrate. However, to enhance the data capacity of a DVD, two optical discs are typically adhered to one another, with the metallic reflective layers of each disc oriented in back-to-back relation. Currently, there are three methods available for adhering these two optical discs to one another to provide a DVD: hot melt contact adhesives, cationic or PCA UV bonding, and free radical UV bonding. Although cationic bonding provides excellent adhesion, it unfortunately corrodes the reflective metal layer. This corrosion, in turn, causes incomplete or inaccurate data retrieval. In an effort to circumvent this problem, specialized protective coatings are typically applied over the reflective metal layers of such individual DVD discs prior to the application of such adhesives thereto.

In addition to those mentioned previously, there are other problems with existing optical disc technology that must be addressed by optical disc manufacturers. For example, in CD-DA, CD-ROM and CD-R applications, the reflective layer is the outermost layer, and is thus exposed to the environment. Because of this exposure, the reflective layer is subject to physical damage, such as scratches, abrasion and corrosion, which damage the readability of the optical disc. Radiation-curable coatings are thus typically applied directly onto the reflective layers of these discs in an effort to prevent damage thereto.

While there are at present many radiation-curable coating compositions that are promoted for use in connection with optical discs, such compositions must satisfy stringent requirements in order to be suitable for use in optical disc applications. In particular, it has been recognized that an acceptable coating must cure rapidly upon exposure to radiation, be compositionally stable both prior to (storage stability) and after curing (so that the cured coating layer maintains its protective properties for long periods of time), and provide adequate levels of abrasion resistance. In addition, it has further been recognized that the coatings should exhibit a low level of shrinkage, have appropriate levels of hardness, and resist delamination. The coating must also be compatible with the optical disc as a whole, not causing any problems with data retrieval or the reflective metallic material. Further, the coating should not adversely affect the properties of the optical disc, nor be adversely affected itself, even after the optical disc is exposed to elevated temperature and humidity.

Radiation-curable compositions have long been utilized to provide the aforementioned protective coatings for optical discs due, in part, to their ability to provide an acceptable protective coating to those discs under high speed processing conditions. These compositions have typically been produced from an uncured mixture of ingredients, usually reactive acrylates, the compositions being coated onto the optical recording disc and then cured upon exposure to radiation, e.g., electron beam or UV radiation. One known technique of applying a coating layer to an optical disc is by spin coating. The spin coating technique requires that the viscosity of the uncured coating composition be relatively low. For instance, to obtain a coating layer on an optical disc of uniform thickness by spin coating, the coating composition preferably must have a viscosity of, for example, 100 centipoise or less at 25° C. As each disc is coated using this method, the disc is subjected to radiation to cure the composition. The portion of the coating composition applied onto the optical disc that is not retained on the disc and subsequently cured thereon is returned to a holding tank for reuse. It is thus important for a coating composition to retain an acceptably low viscosity despite being repeatedly subjected to low levels of radiation (due to recycling) during an optical disc production run.

Obtaining adequate adhesion of the radiation-curable coating onto the reflective layer of an optical disc, particularly those comprising silver or gold, is also of significant importance. Without such adhesion, and some degree of coating flexibility, delamination of the coating from the optical disc may result. Delamination can cause inaccurate reading of the disc, and can allow moisture, oxygen or environmental pollutants to contact the reflective layer, introducing corrosion and other imperfections onto the optical disc. Many coating compositions are therefore purposefully designed to be very acidic in nature, as highly acidic compositions are known to provide enhanced levels of adhesion to metallic materials.

Further complicating the manufacturing process is that a coating that provides good results in connection with a CD-ROM (having an aluminum reflective layer) may not provide good results when used on a CD-R or DVD (having a silver and/or gold reflective layer), e.g., data retrieval accuracy may vary. In addition, coating compositions used on the exterior of optical discs may not provide sufficient protection to the silver or gold reflective metallic layer of a DVD from cationic adhesive attack. Thus, a manufacturer is forced to order and inventory a number of different radiation-curable compositions for specific applications, e.g., one for a CD-ROM, one for a CD-R with a dye as a data layer, and one for the metallic surface of a DVD.

In addition, the concurrent use of an organic dye as the data layer and silver as the metallic reflective layer on a disc, e.g., a CD-R, has given rise to compatibility problems with existing radiation-coating compositions. For example, existing radiation-curable coating compositions applied onto CD-R discs that include an organic dye and silver reflective layer provide, among other problems, unacceptable levels of jitter, delamination, and clarity.

Thus, there exists a need for a radiation-coating composition that provides acceptable properties on various types of optical discs, particularly on discs that include an organic dye as the data layer and a silver reflective layer. There is a further need for a composition that exhibits, and also provides optical discs with, enhanced performance levels as compared to existing compositions and optical discs.

SUMMARY OF THE INVENTION

The present invention meets the foregoing and other needs by providing, in one aspect, a radiation-curable coating composition which, after application and curing on an optical disc, provides the disc with enhanced levels of performance in various respects as compared to optical discs prepared using conventional radiation-curable coating compositions. For example, the invention provides radiation-curable compositions that are universal in the sense that they can be applied onto different types of optical discs, and on a variety of reflective materials, e.g., aluminium, gold, silver, and other metallic alloys used as a reflecting layer, and provide good performance. The composition provides excellent results even when applied onto a disc having an organic dye as the data layer and silver as the reflective layer.

In another aspect of the present invention, these same compositions can provide protection to the reflective metallic surfaces of a DVD when cationic adhesives are used as the bonding agent in manufacturing the DVD. In this aspect, the present invention provides a DVD comprising an adhesive composition and two optical discs adhered to one another by the adhesive composition, wherein at least a portion of each disc which contacts the adhesive composition includes a radiation-cured coating provided by curing a radiation-curable coating composition having a pH greater than or equal to 3 and comprising at least one reactive acrylate, wherein the coating exhibits shrinkage of no greater than about 12% after curing.

Moreover, prior to the discovery of the present invention, it was not appreciated that an acceptable radiation-curable coating composition for optical discs could be prepared that had both a relatively high pH and many of the desirable properties of existing low pH compositions, let alone a relatively high pH composition that provided improved properties in some respects.

In yet another aspect, the present invention provides just such a radiation-curable coating composition. The composition exhibits a pH that is higher than that of comparable compositions, without any appreciable loss of various other desirable properties of the coating composition or the coated optical disc, e.g., shrinkage, delamination, curing speed, jitter and others referred to herein. Moreover, the present invention provides enhanced properties in several respects as compared to existing compositions.

A further aspect of the present invention provides an optical disc that provides excellent data retrieval properties, exemplified by a property known as jitter, even after the disc is subjected to a harsh environment. This optical disc comprises a polymer substrate and a radiation-cured coating provided by curing a radiation-curable coating composition having a pH greater than or equal to 3 and comprising at least one reactive acrylate, wherein the optical disc exhibits jitter of no greater than about 35 ns after being subjected to an environment having a temperature of at least 85° C. and a relative humidity of at least 85% for a period of at least 96 hours.

In addition to the foregoing, and prior to the discovery of the present invention, it was not appreciated that recycling of the radiation-curable coating composition during the application of the composition onto the reflective layer of a disc could adversely affect the properties of the finished optical disc. More specifically, the recycling process has the undesirable result of allowing some of the coating composition to be prematurely cured. This prematurely cured material is then mixed into uncured coating composition during the recycling process, with this mixture applied onto the disc during manufacturing. This mixing of prematurely cured and uncured coating compositions provides a finished coating that may adversely affect the performance of the finished optical disc.

Another aspect of the present invention addresses the foregoing problem and others by providing a radiation-curable composition having a relatively slow initial curing rate that surprisingly also provides an overall cure that exceeds the cure provided by existing compositions over the same time period. This further aspect of the present invention provides an optical disc comprising a polymer substrate and a radiation-cured coating provided by curing a radiation-curable coating composition comprising at least one reactive acrylate, wherein the radiation-curable coating provides a percent reacted acrylate unsaturation (% RAU) of less than about 50 after 0.25 sec and greater than about 90 after 5 secs.

These and other features and advantages of the various aspects of the present invention will be more readily apparent upon reading the following description of a preferred exemplified embodiment of the invention and upon reference to the accompanying drawings.

DETAILED DESCRIPTION OF THE PREFERRED EMBODIMENTS

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

Figure 1:
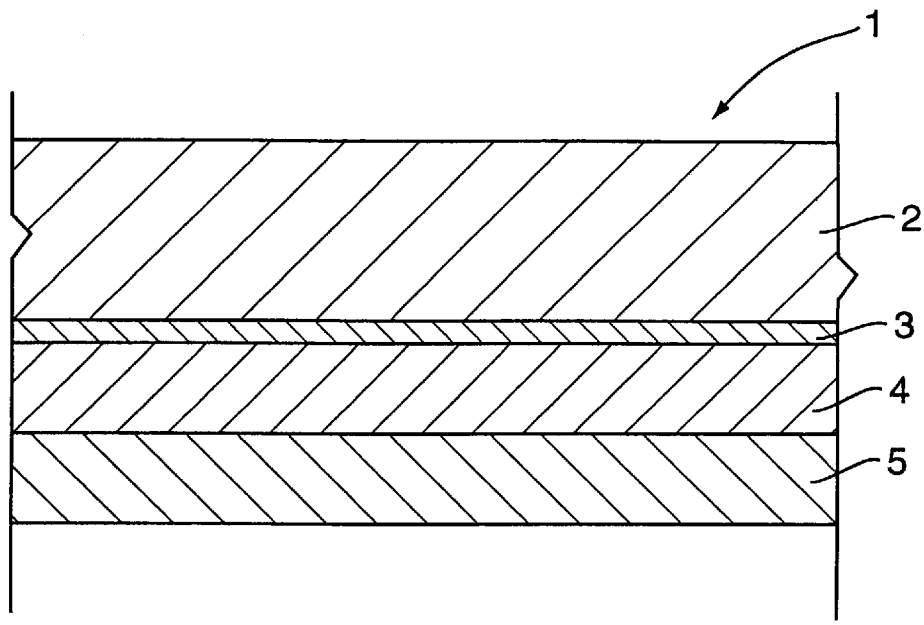
FIG. 1 is a cross-sectional view of a portion of a CD-R optical disc that uses a dye as the data layer.
Figure 2:
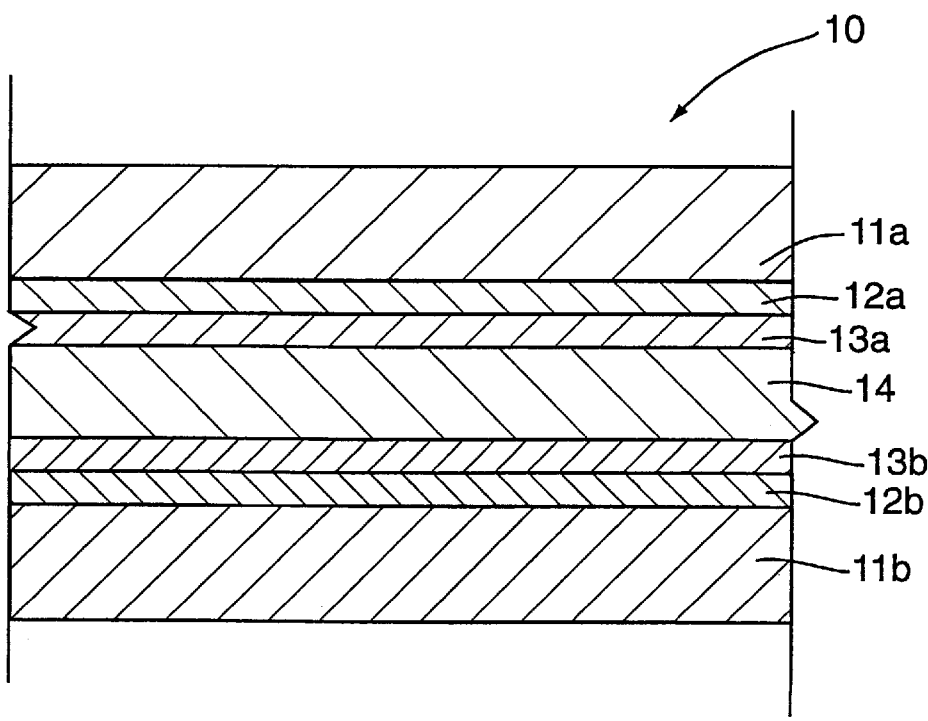
FIG. 2 is a cross-sectional view of a portion of a double-sided, single layer, DVD optical disc.

FIGS. 1 and 2 illustrate typical CD-R and DVD optical disc constructions, respectively, wherein the composition of the present invention is utilized to provide the coating layer. Turning initially to FIG. 1, there is illustrated in cross-section a portion of a CD-R 1 that uses an organic dye layer as the recording medium. Specifically, the CD-R 1 includes, in order, a polycarbonate substrate 2, an organic dye layer 3, a reflective layer 4, and a coating layer prepared from the radiation-curable coating composition described herein.

FIG. 2 illustrates in cross-section a portion of a double-sided, single layer, DVD optical disc 10. This DVD includes, in order, a polycarbonate substrate 11a, a reflecting layer 12a, a coating layer prepared from the radiation-curable coating described herein 13a, a bonding or adhesive layer 14, a second coating layer prepared from the radiation-curable coating described herein 13b, a second reflecting layer 12a, and a second polycarbonate substrate 11b.

The radiation-curable composition of the present invention includes at least one reactive acrylate. As used herein, and unless otherwise indicated, reference to a reactive acrylate includes both acrylates and methacrylates, denotes a component having at least one acrylate functional group that is capable of cross-linking upon exposure to radiation, and includes both monomers and oligomers, as these terms are understood and used by those skilled in the art.

The reactive acrylates used in the composition should be selected in view of the properties desired in the coating both before and after curing, as discussed in more detail herein. Advantageously, a plurality of different reactive acrylates may be included in the composition to achieve a balance in the properties of the final coating composition. Reference to the teachings provided herein will permit one of ordinary skill to understand the basic functions of each type of reactive acrylate. This in turn will allow one to formulate radiation-curable compositions that are within the scope and spirit of the invention as described and claimed herein.

Whether the composition includes one or more reactive acrylates, the glass transition temperature of the composition should be limited to provide a composition that does not have excessive hardness or brittleness, leading to undesired delamination, nor a composition that is too soft, wherein the protective properties of the cured coating are unduly compromised. In this respect, the glass transition temperature of the composition should advantageously range between about 30° C. and 100° C., and most preferably between about 40° C. and 70° C. Moreover, the components should be selected to provide the composition with a viscosity that is sufficiently low to enable application of the composition onto an optical disc by the desired method. For example, if spin coating is utilized, the viscosity of the composition should range from about 20 cps to about 1000 cps at 25° C. Advantageously, the viscosity should range between about 25 cps to about 100 cps at 25° C.

The components of the composition should be further selected so that the composition as a whole has a pH that is greater than or equal to about 3. As mentioned previously, prior to the discovery of the present invention, radiation-curable coating compositions were designed to have a low pH, e.g., well below 3, to provide adequate levels of adhesion onto the optical discs, and particularly onto the metallic layer of those discs.

One aspect of the present invention overcomes the handling and other problems associated with these low pH compositions by providing a radiation-curable composition that meets, and in several respects exceeds, the performance of those compositions while having a higher pH. Advantageously, and in terms of the present invention, the pH of the composition may be greater than or equal to 3 (and up to 14), and preferably the pH may range from 3 to about 10. More preferably, the composition may have a pH of from about 3.5 to about 8.5, and most preferably from about 4 to about 5.5. In preparing the inventive compositions, one should be mindful that the impurities present in the commercially-supplied reactive acrylate formulations can affect the pH of the overall composition.

A preferred method of achieving the foregoing relatively high pH compositions is by the inclusion of an adhesion promoting compound that is substantially free of acid functionalities. These components, which typically have a pH of above about 3, and preferably above about 5, function to enhance the adhesion of the cured coating to the various surfaces of optical discs, while allowing the pH of the overall composition to remain at relatively high levels. Illustrative suitable adhesion promotion compounds that may be used in the inventive composition are CL1039, 4-HBA (4-hydroxybutyl acrylate), SR9008, SR9011, SR9012,SR9016, SR9017, CD9009 and CD9050, FX9801, FX9803, NVP (N-vinyl-2-pyrrolidinone), PVP (2-pyrrolidone-1-ethenyl, homoploymer), 3-mercaptopropyl trimethoxy silane, gamma-aminopropyltriethoxysilane, 3-aminopropyl trimethoxy silane, N-(2-aminoethyl)-3-aminopropyl trimethoxy silane, Y-9389 and N-vinyl caprolactam. The silanes, e.g., 3-mercaptopropyl trimethoxy silane, are preferred.

The adhesive promoting components are advantageously present in the composition in limited amounts. Depending upon the nature of the reactive acrylates selected, as discussed further below, the adhesive promoting components are advantageously present in an amount ranging from about 0.1 wt. % up to about 20 wt. %, advantageously up to about 10 wt. %, and preferably from about 0.5 wt. % to about 5 wt. %.

As previously mentioned, the present invention preferably includes more than one different reactive acrylate compound. In order to obtain adequate hardness in the cured coating, e.g., to provide protection to the optical disc against abrasion, the composition advantageously includes a reactive acrylate having at least 3 acrylate functionalities. The amount of this type of component should be limited, however, because it has an adverse effect on certain desirable properties such as adhesion, delamination and shrinkage. Further, these components tend to react relatively quickly (as compared to components having a lesser number of acrylate functionalities) when exposed to radiation. Accordingly, one should lessen the amount of this component if one desires to slow the rate of cure.

In order to achieve a balancing between the aforesaid properties, this reactive acrylate should constitute no more than about 30 wt. %, and more than about 5 wt. %. Advantageously, this component should range from about 15 wt. % to about 25 wt. %, of the composition. Preferably, this acrylate should constitute about 18 wt. % to 22 wt. % of the composition.

A wide variety of reactive acrylates having at least 3 acrylate functionalities are available, and are suitable for use in the present composition. Illustrative of such acrylates are propoxylated glycerol tri(meth)acrylate, trimethylolpropane tri(meth)acrylate, ethoxylated trimethylolpropane tri(meth)acrylate, propoxylated trimethylolpropane tri(meth)acrylate, pentaerythritol tri(meth)acrylate, pentaerythritol tetra(meth)acrylate, ditrimethylolpropane tri(meth)acrylate, dipentaerythritol penta(meth)acrylate, dipentaerythritol hydroxy penta(meth)acrylate, propoxylated glyceryl tri(meth)acrylate and mixtures thereof.

The curable composition advantageously also contains at least one, and preferably at least two, reactive difunctional acrylates. The diacrylates should comprise the majority of the reactive acrylate components of the present composition, and should be selected based upon their relative contribution to the hardness, shrinkage and delamination properties of the cured coating and, if important, the rate of cure. More specifically, while these acrylates contribute less to the hardness of the coating as compared to the components having at least 3 acrylate functionalities, there is nevertheless some contribution in that regard, as well as a relative lessening of shrinkage coupled with an increased level of adhesion. These acrylates also cure relatively quickly as compared to monofunctional acrylates.

The amount of diacrylate included in the composition should be based upon the desired properties of the composition, both prior to and after curing. Advantageously, and in view of the foregoing teaching, the majority of acrylates in the composition should be diacrylates, with the amount ranging from about 20 wt. % to about 60 wt. % of the composition. Preferably, the diacrylates are present from about 30 wt. % to about 50 wt. %, and most preferably from about 35 wt. % to about 45 wt. % of the composition.

A number of suitable difunctional acrylates are available and may be used in the present composition. Exemplary of suitable diacrylate reactive acrylates include tripropylene glycol di(meth)acrylate, 1,6-hexanediol di(meth)acrylate, polyethylene glycol di(meth)acrylate, propoxylated neopentyl glycol di(meth)acrylate and mixtures thereof.

It is preferred that at least one of the reactive diacrylates have a cyclic or ring structure, e.g., a 3–6 membered ring. While not desiring to be bound to any particular theory, it is believed that diacrylates which include ring structures provide increased hardness in the resulting composition as compared to diacrylates without such ring structures, while at the same time not having an unduly adverse impact on the viscosity of the composition (which affects the ability of the composition to be applied onto an optical disc). These relatively bulky acrylates are also thought to add a degree of free volume in the resulting cured coating. With free space available, molecular relaxation may occur, rendering the coating less brittle, and providing the coating with a greater resistance to delamination when exposed to temperature extremes. Examples of reactive diacrylates having such a ring structure include ethoxylated bis-phenol A di(meth)acrylates and related diacrylates.

If two different diacrylates are used, with one having a cyclic functional group and the second not having a cyclic group, the relative proportions of the former to the latter should range from about 1:10 to about 1:1 (advantageously to about 1:3). On a weight percentage basis, the composition advantageously includes from about 30 wt. % to about 50 wt. % of the non-cyclic diacrylate, and about 2 wt. % to about 20 wt. % of the cyclic diacrylate, and preferably from about 35 wt. % to 45 wt. %, and about 5 wt. % to about 10 wt. %, respectively.

A third reactive acrylate that may be included in the composition is a monofunctional acrylate. The monoacrylates react relatively slowly as compared to multifunctional acrylates. While they also provide the coating with enhanced resistance to shrinkage and delamination, the hardness of the cured coating is reduced. Thus, while this acrylate may be provide in an amount from about 0.1 wt. % to about 30 wt. %, it is advantageously provided in relatively limited amounts, from about 4 wt. % to about 15 wt. % of the composition. Suitable acrylates are well known and readily available. Examples of suitable monoacrylates include 2-(2-ethoxy)ethyl(meth)acrylate, polypropylene glycol (meth)acrylate, neopentyl glycol dialkoxy(meth)acrylate, isobornyl-(meth)acrylate, tetrahydrofurfuryl(meth)acrylate, 2-phenoxyethyl (meth)acrylate and mixtures thereof.

The radiation-curable composition may optionally further include a relatively high molecular weight polyester, epoxy or urethane acrylate component. In a preferred embodiment of the invention, this component is separate and distinct from the acrylates described previously. However, if desired, this relatively high molecular weight acrylate may constitute one of the foregoing mono or multifunctional acrylates. When included, this component augments the hardness in the cured coating composition, while not unduly affecting the desired low viscosity of the curable composition. This is particularly true of the epoxy acrylates, which also increase cure speed. The urethane acrylates, while increasing the hardness to some degree, also provide the cured composition with an enhanced level of flexibility. While a variety of these relatively high molecular weight acrylates may be used, they should advantageously have an average molecular weight in the range of above about 700, preferably above about 1000 and most preferably above about 1200 without exceeding about 7000.

The aforesaid relatively high molecular weight acrylates may be present in any suitable amount, depending on the degree of hardness required in the cured coating. Advantageously, this acrylate is multi-functional, and is provided in an amount ranging from about 2 wt. % to about 20 wt. %, more advantageously from about 4 wt. % to about 14 wt. %, and preferably from about 6 wt. % to about 10 wt. %.

Examples of preferred relatively high molecular weight, multi-functional (meth)acrylate components include polyester (meth)acrylates, polyurethane (meth)acrylates and (meth)acrylated epoxy (meth)acrylates. (Meth)acrylated epoxy (meth)acrylates are most preferred as they tend to have a relatively low viscosity, yet enhance coating hardness. More specific examples of preferred components include what are referred to in the industry as oligomers, e.g., tri- and tetra-functional (meth)acrylated polyester oligomers, Novolak polyester oligomers, di- and tri-functional aromatic urethane acrylate oligomers, hexafunctional aliphatic urethane acrylate oligomers, epoxy Novolak acrylates, and mixtures thereof.

A further advantage of the radiation-curable composition of the present invention is that, when applied onto a disc that utilizes an organic dye as the data recording layer and an oxidizable metallic material, particularly silver or gold alloys, as the reflective layer, excellent performance is obtained, even after exposure to the aforedescribed harsh environment. In particular, and while the composition is useful with any such dyes, it finds advantageous use in connection with a CD-R that includes at least one azo, cyanine or phthalocyanine dye and a silver reflective layer. The composition is particularly preferred when phthalocyanine dyes are included on the discs. Prior to the present invention, radiation-curable coating compositions that were compatible with CD-R optical discs made of an organic dye and a silver (or gold) reflective layer were not known, e.g., acceptable levels of jitter, delamination, and clarity were not observed. Thus, the present invention provides the additional advantage of permitting a manufacturer to provide discs using these materials.

At least one photoinitiator may also be included in the inventive compositions to enhance the curing of the composition. Examples of useful photoinitiators that may be used in the radiation-curable compositions of the present invention include, but are not limited to 2-hydroxy-2-methyl-1-phenyl-propan-1-one, a 50:50 blend of 2-hydroxy-2-methyl-1-phenyl-propan-1-one and 2,4,6-trimethylbenzoyl diphenyl phosphine oxide, 1-hydroxycyclohexyl-phenylketone and 2-methyl-1-[4-(methylthio)phenyl]-2-morpholino propan-1-one. The photoinitiator may be present in amounts in the range from about 0.25 to about 20 wt. % of the composition, and is preferably present in the range from about 2 to about 15 wt. % of the composition.

The radiation-curable composition of the present invention may optionally contain other ingredients known in the art, for example, anticorrosion agents, surfactants (e.g., LG-99, proprietary, Estron Chemical), stabilizers (e.g., hydroquinone monomethyl ether, BHT, Tetrakis[methylene-(3, 5-di-tertbutyl-4-hydroxy-hydrocinnamate)]-methane) and antistatic agents. Other optional components include colorants, e.g., dyes, pigments and the like, for asthetic reasons. If used, the colorants may be present from about 0.1 to about 15 wt. %, and preferably about 0.1 to about 5 wt. %.

Dyes are preferred because they avoid concerns associated with pigment particle size, pigment dispersion and the like. However, when a dye is used, the amount should be limited so as to avoid any substantial adverse effect on the properties of the cured coating. Illustrative of suitable dyes are polymethine dyes, di and triarylmethine dyes, aza analogues of diarylmethine dyes, aza (18) annulenes (or natural dyes), nitro and nitroso dyes, azo dyes, anthraquinone dyes and sulfur dyes. These dyes are well known in the art.

The dyes or dye precursors may also be provided in the form of reactive prepolymers. Preferably, the reactive dye or dye precursor is itself UV-curable, and becomes chemically bonded in the cured coating. Reactive dyes or dye precursors provide cured compositions in which dye migration is reduced, thereby minimizing dye agglomeration in the cured, finished coating. Reactive dyes or dye precursors also reduce dye breakout or extractability in the cured, finished coating.

The reactive dyes and dye precursors can be made by reacting a linking compound, which includes a radiation-curable functionality, with a dye or dye precursor. Similar considerations apply to colorless dyes that will change to a color upon exposure to ultraviolet radiation during cure. The reactive functionality in the dye or dye precursor can be any group that is capable of reacting with a linking group that is used to make the reactive dyes or dye precursors. Illustrative of reactive functionalities that are found in, or can be added to, dyes or dye precursors include, but are not limited to, hydroxyl, amino, including secondary amino, thiol, carboxyl, mercapto, vinyl, acryl, epoxy, carbamate, or the like.

The linking compound desirably comprises a radiation-curable functionality and a second functionality capable of reacting with the reactive functionality of the dye or dye precursor. Preferably, the radiation-curable functionality of the linking group is ethylenic unsaturation, which can be polymerized through radical polymerization or cationic polymerization. For example, suitable compounds which contain ethylenic unsaturation are acrylates, methacrylates, styrene, vinyl ether, vinylester, N-substituted acrylamide, N-vinyl amide, maleate esters, fumarate esters and the like. Other types of compounds that can be used to form the reactive dyes or dye precursors are compounds that include at least one of an epoxy group, a hydroxyl group, a thiol-ene or an amine-ene. Acrylated dyes are preferred.

In another aspect of the present invention, an optical disc is provided which comprises a polymer substrate and a radiation-cured coating provided by curing a radiation-curable coating composition having a pH greater than or equal to 3 and comprising at least one reactive acrylate, wherein the optical disc exhibits jitter of no greater than about 35 ns after being subjected to an environment having a temperature of at least 80° C. and a relative humidity of at least 85% for a period of at least 96 hours.

Jitter is a measure of the performance of an optical disc, and concerns errors in timing. It is typically utilized to evaluate the performance of a CD-R. The present invention provides a composition, and optical disc prepared using that composition, wherein the optical disc exhibits jitter of less than about 35 nanoseconds (ns), and advantageously less than about 30 ns, and preferably no greater than about 25 ns, after exposure to the harsh environment described previously. The test for determining optical disc jitter is provided in what is commonly referred to by those skilled in the art as the Orange Book, published by Philips NV. In particular, jitter, as set forth herein, was measured using a CD CATS (Audio Development).

The pH of the compositions disclosed herein was measured by combining 5 ml of the composition with 20 ml of distilled water. The combination is shaken well, and allowed to separate into two phases. The pH of the resulting aqueous phase is determined at 25° C. using a pH meter having a KCl electrode calibrated using pH 4.0 and pH 7.0 commercially-available calibration solutions, and constitutes the pH of the composition.

The radiation-curable coating compositions of the present invention also provide adequate and appropriate levels of pencil hardness. Generally, this hardness will range from 2B to 2H after exposure to the harsh environment. The pencil hardness is measured according to ASTM D3363-92A.

The radiation-curable coatings of the present invention further provide a cured coating that exhibits shrinkage of no greater than about 12%, advantageously less than about 9%, preferably less than about 8% and most preferably less than about 5%, after curing. Shrinkage is determined by comparing the density of the liquid composition with the density of the cured composition as follows:

shrinkage (%)=100×density of cured composition−density of liquid/density of cured composition Delamination is also of concern to manufacturers, who want their products to withstand the rigors of shipping, and customers living in warm, tropical climates. With this in mind, the present composition provides a radiation cured coating that, after being applied onto an aluminum reflective layer exhibits delamination over less than about 10% of the area onto which the coating is applied after exposure to an environment of at least 80° C./85% relative humidity for at least 96 hours. Advantageously, delamination occurs over no more than about 5%, preferably over no more than about 2% over the area onto which the coating is applied after exposure to the aforesaid environment for 96 hours. When the coating is applied over a silver reflective layer and exposed to the same environment, the cured coating exhibits delamination over less than about 25% of the area onto which the coating is applied after exposure to an environment of at least 80° C./85% relative humidity for at least 96 hours. Advantageously, delamination occurs over no more than about 12%, preferably over no more than about 10% and most preferably over no more than about 7%, during that same time period.

Further aspects of the present invention relate to the rate and degree of cure exhibited by the radiation-curable coating composition. In that regard, the invention provides a radiation-cured coating which is capable of providing a % RAU (percent reacted acrylate unsaturation) of less than about 50 after 0.25 seconds and greater than about 90 after 5 seconds. The significance of this relatively low initial rate of cure, coupled with a later relatively high degree of cure, was mentioned previously. Advantageously, the composition is capable of providing a % RAU of less than about 50 after 0.5 sec, and a % RAU of less than about 25 after 0.25 sec.

While not desiring to be bound to any particular theory, it is believed that the initial relatively low viscosity of the composition affects, at least in part, the initial relatively low rate of cure. More specifically, the low viscosity permits oxygen to diffuse into the composition, where the oxygen interferes, or hinders, the cross-linking reactions between the reactive acrylates. As the cross-linking reactions between the reactive acrylates proceed, however, the composition begins to thicken. This thickening slows the rate of oxygen diffusion into the composition that, in turn, permits the rate of cure of increase. Based upon the foregoing theory, and if one desires to control the rate of cure in the manner of the present invention, one of the factors that should be considered in the selection of the reactive acrylates is to select those that will provide a very low initial viscosity, as previously discussed. Another factor is the use of relatively low levels of multifunctional acrylates in the composition. This appears to further slow the initial rate of curing.

Yet another aspect of the present invention provides a coating that protects the metallic layers of the discs used to manufacture a DVD from attack by DVD adhesives, including cationic adhesives. The structure of a DVD, and adhesives used in their manufacture, including cationic adhesives, are well known and will not be repeated herein. The inventive coating composition may be applied onto the metallic layer of a disc that is to be adhered to a second disc to provide a DVD (or any other surface, if desired), and then, typically, cured in a conventional manner prior to application of the adhesive. The degree of cure prior to application must be sufficient to provide for adequate protection of the surface after adhesion application.

The preparation and use of the compositions of the present invention may be completed by any convention method. Preferably, the radiation-curable composition of the present invention is prepared from an uncured admixture of ingredients. This uncured admixture can be applied to an optical disc using spin coating techniques or electro-spray techniques. Preferably, the formulation of the present invention is applied to a substrate using a spin coating technique, and the formulation is then cured by ultraviolet radiation to form a cured composition.

Spin coating allows for the quick and easy production of an extremely uniform coated layer having a thickness of 3 to 20 μm, preferably 3 to 15 μm, more preferably 5 to 15 μm, most preferably from 6 to 10 μm. According to the spin coating technique, a mixture of the uncured components of the composition is prepared. The mixture is then applied onto the optical disc using a conventional spin coating apparatus. Such an apparatus generally includes a dispensing needle, a syringe, and a pump. Dispensing the composition onto the disc may involve either manually or automatically dispensing the fluid by means of a syringe and a needle. Preferably, the disc to be coated is pre-cleaned with ionized air prior to spin coating. For compositions having a viscosity in the range from 5 to 100 centipoise, a needle pressure of 5 to 20 psi (25 to 103 mm Hg) delivers a suitable amount of the admixture onto the center of a disc in about 2 seconds when the disc is spiraling at 30 to 100 rpm. Preferably, an in-line filter (0.1 to 2 μm) is used to remove particles from the admixture before the admixture is allowed to pass through the dispensing needle. After delivery, a high spinoff speed of 1800 to 3500 rpm for 3 to 5 seconds disperses the solution into a thin, uniform coating, advantageously from about 5 μm to about 7 μm in thickness.

The uncured composition is then cured with a suitable form of radiation. Preferably, curing occurs in a chamber fitted with an exhaust fan. Typically, the exhaust fan is operated during curing in order to remove low boiling volatile components from the chamber.

The uncured composition of the present invention may be cured using any suitable form of radiation, for example electron beam radiation or ultraviolet radiation. It is preferred that the composition be photocurable, i.e., curable with ultraviolet radiation. Various sources of UV radiation are suitable, including electric powered arc lamps, such as medium pressure or high pressure mercury lamps, and electrodeless lamps such as H-type, D-type, or V-type metal halide lamps. The specific radiation source should be selected to correspond with the absorption spectra of the photoinitiator used. As an example, a UV radiation source operating at wavelengths of between 240 to 450 nm and an energy of 200 to 450 mj/cm$^2$ for 2 to 6 seconds is preferable.

The objects and advantages of the present invention are further illustrated by the following examples. The particular materials and amounts thereof recited in these examples, as well as the conditions and details, should not be construed as a limitation on the claims of the invention.

EXAMPLE I

This example compares the relative shrinkage and pH of radiation-curable compositions of the present invention (Composition A and B), and three comparative radiation-curable compositions, referred to herein as Comparative Samples 1, 2 and 3. The example also provides additional performance data for Compositions A and B.

Preparation of Composition A

The following components were combined in the indicated amounts to provide an intermediate composition:

| Component | Amount (wt. %) |
|---|---|
| propoxylated glycerol triacrylate monomer | 20.0 |
| tripropylene glycol diacrylate | 41.0 |
| ethoxylated$_4$ bisphenol A dimethacrylate | 8.0 |
| tetrahydrofurfuryl acrylate | 8.45 |
| epoxy Novolak acrylate | 8.0 |
| 1-hydroxycyclohexylphenylketone | 6.0 |
| 2-hydroxy-2-methyl-1-phenyl-propan-1-one | 8.0 |
| LG-99 | 0.5 |
| hydroquinone monomethyl ether | 0.05 |
| Total | 100.0 |

Composition A was then prepared by combining 99.0 wt. % of the intermediate composition and 1.0 wt. % of 3-mercaptopropyl trimethoxy silane.

Preparation of Composition B

The following components were combined in the indicated amounts to provide an intermediate composition:

| Component | Amount (wt. %) |
|---|---|
| propoxylated glycerol triacrylate monomer | 21.0 |
| tripropylene glycol diacrylate | 41.0 |
| ethoxylated$_4$ bisphenol A diacrylate | 6.0 |
| phenoxyethyl acrylate | 8.45 |
| epoxy Novolak acrylate | 8.0 |
| 1-hydroxycyclohexylphenylketone | 6.0 |
| 2-hydroxy-2-methyl-1-phenyl-propan-1-one | 8.0 |
| LG-99 | 0.5 |
| hydroquinone monomethyl ether | 0.05 |
| 3-mercaptopropyl trimethoxy silane | 1.0 |
| Total | 100.0 |

An analysis of the five compositions showed that Comparative Sample 1 has a pH of 2.2 and shrinkage of 9.7%, Comparative Sample 2 has a pH of 2.7 and a shrinkage of 13.2% and Comparative Sample 3 has a pH of 2.9 and a shrinkage of 13.2%. Composition A has a pH of 3.9, shrinkage of 8.0%, and a HB hardness after curing. Lastly, Composition B has a pH of 3.9, shrinkage of 8.0%, and a HB hardness after curing.

Delamination of Composition A after its application onto the aluminum reflective layer of an optical disc, curing the composition, and subjecting the thus coated disc to an 80° C./85% relative humidity environment was 0.5% on Days 4–6, 1% on Day 7 and 2% on Days 8–16.

Delamination of Composition B after its application onto the aluminum reflective layer of an optical disc, curing the composition, and subjecting the thus coated disc to an 80° C./85% relative humidity environment was 5% on Days 4–5, 7% on Day 7, 8% on Day 8 and 10% on Days 11–21.

Delamination of Composition A after its application onto the silver reflective layer of an optical disc, curing the composition, and subjecting the thus coated disc to an 80° C./85% relative humidity environment was 7% on Day 1, 10% on Day 5, 12% on Day 9 and 15% on Day 12.

Delamination of Composition B after its application onto the silver reflective layer of an optical disc, curing the composition, and subjecting the thus coated disc to an 80° C./85% relative humidity environment was 5% on Day 1, 7% on Day 5, 10% on Days 9–12.

EXAMPLE II

This example compares the cure rate of radiation-curable compositions of the present invention (Compositions A and B of Example I, and Composition C described below) and the three comparative radiation-curable compositions analyzed in Example I (Comparative Samples 1, 2 and 3). Specifically, the example demonstrates that the compositions of the present invention have the advantageous property of curing at a relatively slow initial rate, yet providing a high degree of curing overall.

Preparation of Composition C

The following components were combined in the indicated amounts to provide an intermediate composition:

| Component | Amount (wt. %) |
|---|---|
| propoxylated glycerol triacrylate monomer | 20.0 |
| tripropylene glycol diacrylate | 29.0 |
| ethoxylated$_4$ bisphenol A dimethacrylate | 20.0 |
| tetrahydrofurfuryl acrylate | 8.45 |
| epoxy Novolak acrylate | 8.0 |
| 1-hydroxycyclohexylphenylketone | 6.0 |
| 2-hydroxy-2-methyl-1-phenyl-propan-1-one | 8.0 |
| LG-99 | 0.5 |
| hydroquinone monomethyl ether | 0.05 |
| Total | 100.0 |

Composition C was then prepared by combining 99.0 wt. % of the intermediate composition and 1.0 wt. % of A-189.

Figure 3:
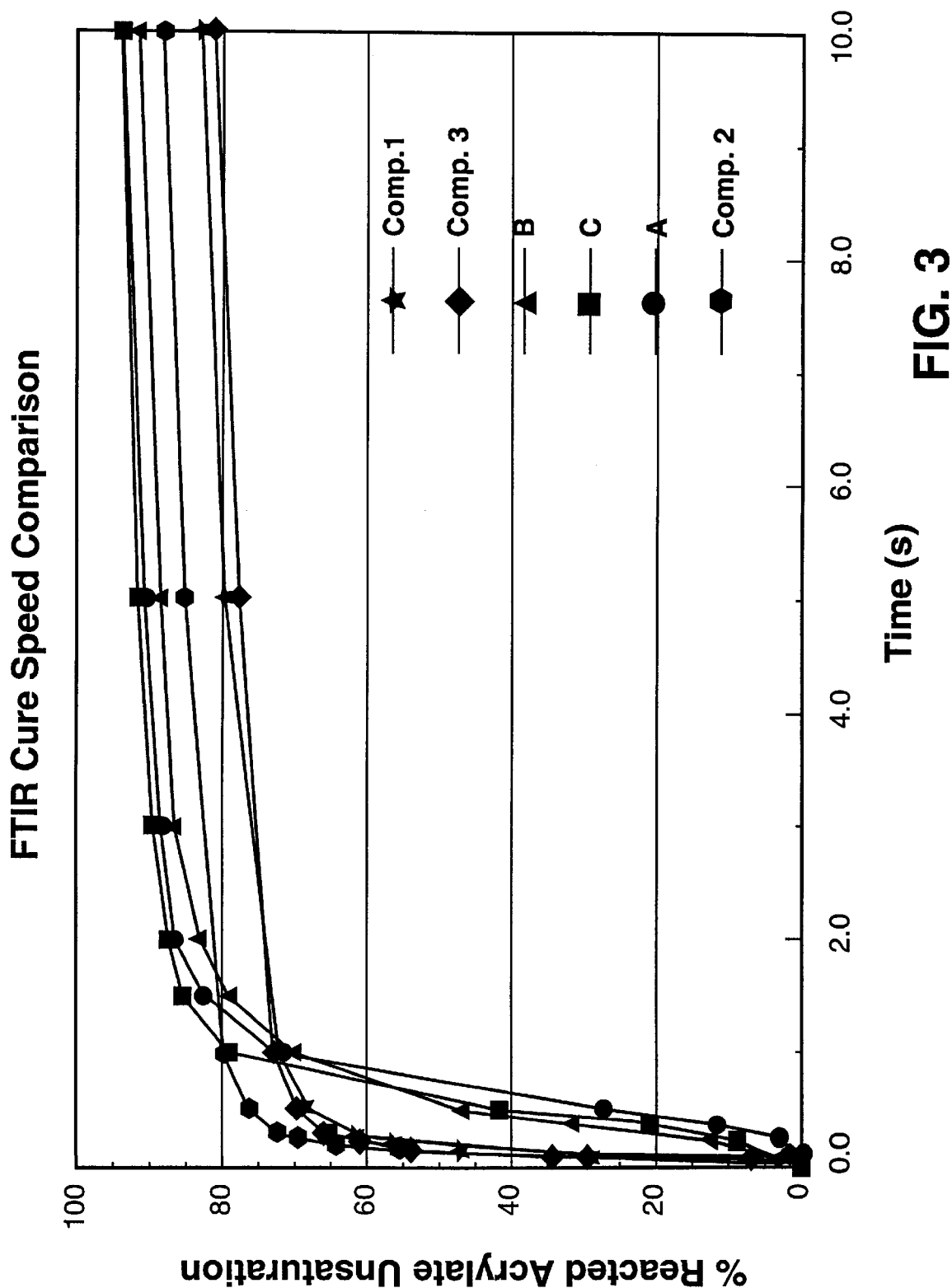
FIG. 3 is a graph of data comparing the rate and degree of cure of several radiation-curable compositions.

A Fourier Transform IR (FTIR) curve for each of the foregoing compositions was generated using the procedure as set forth at page 915 of Decker, "*Kinetic Study of Light-Induced Polymerization by Real-Time UV and IR Spectroscopy*," J. Polymer Sci., 30 913–928, 915 (1992). This curve plots the degree of cure per unit of time, as measured by the percent reacted acrylate unsaturation (% RAU) for the composition undergoing testing. The data was collected, and is presented in the form of a curve in FIG. 3. The same data is set forth in the following Table.

| Cure Time (secs) | Comp. A (% RAU) | Comp. B (% RAU) | Comp. C (% RAU) | Compar. Sample 1 (% RAU) | Compar. Sample 2 (% RAU) | Compar. Sample 3 (% RAU) |
|---|---|---|---|---|---|---|
| 0.0 | 0.0 | 0.0 | 0.0 | 0.0 | 0.0 | 0.0 |
| 0.25 | 43.6 | 37.8 | 9 | 70.2 | 62.2 | 65.1 |
| 0.5 | 76.9 | 76.8 | 42 | 76.8 | 69 | 70.4 |
| 1 | 86.1 | 87.3 | 80 | 80.4 | 73 | 73.5 |
| 5 | 92.7 | 93.7 | 92 | 85.8 | 80.2 | 78.5 |
| 10 | 95 | 95.9 | 94 | 88.4 | 83.3 | 81.5 |

EXAMPLE III

Preparation of Composition D

This example is illustrative of colored coating compositions that can be obtained using the teachings of the present invention.

The following components were combined in the indicated amounts to provide an intermediate composition:

| Component | Amount (wt. %) |
|---|---|
| propoxylated glycerol triacrylate monomer | 21.0 |
| tripropylene glycol diacrylate | 41.0 |
| ethoxylated$_4$ bisphenol A diacrylate | 6.0 |
| tertrahydrofurfuryl acrylate | 8.45 |
| epoxy Novolak acrylate | 8.0 |
| 1-hydroxycyclohexylphenylketone | 6.0 |
| 2-hydroxy-2-methyl-1-phenyl-propan-1-one | 8.0 |
| LG-99 | 0.5 |
| hydroquinone monomethyl ether | 0.05 |
| 3-mercaptopropyl trimethoxy silane | 1.0 |
| Total | 100.0 |

Composition D was then prepared by combining 97.0 wt. % of the intermediate composition and 3.0 wt. % of Reactint X-96 Orange dye (Milliken). The pH of this composition was 4.4.

Any patents and articles referenced herein are incorporated by reference. Further, any reference herein to a component in the singular is intended to indicate and include at least one of that particular component, i.e., one or more.

Novel and improved radiation-curable coating compositions and optical discs coated with such compositions have been provided by the present invention which exhibit enhanced properties as compared to existing radiation-curable compositions and optical discs coating with such compositions. Various additional modifications of the embodiments specifically illustrated and described herein will be apparent to those skilled in the art, particularly in light of the teachings of this invention. The invention should not be construed as limited to the specific form and examples as shown and described, but instead is set forth in the following claims.

What is claimed is:

1. An optical disc comprising a polymer substrate, a metallic reflective layer, and a radiation-cured coating provided by curing a radiation-curable coating composition having a pH greater than or equal to 3 and comprising at least one reactive acrylate, wherein the optical disc exhibits jitter of no greater than about 35 ns after being subjected to an environment having a temperature of at least 80° C. and a relative humidity of at least 85% for a period of at least 96 hours.

2. The optical disc according to claim 1, wherein the optical disc further comprises at least one organic dye as a data recording medium.

3. The optical disc according to claim 2, wherein the metallic reflective layer comprises silver.

4. The optical disc according to claim 3, wherein the at least one organic dye is a cyanine, azo or phthalocyanine dye.

5. The optical disc according to claim 1, wherein the pH of the radiation-curable coating composition is from 3 to about 10.

6. The optical disc according to claim 5, wherein the pH of the radiation-curable coating composition is from about 3.5 to about 8.5.

7. The optical disc according to claim 1, further comprising a metallic layer comprising silver, gold or mixtures thereof located on at least a portion of the polymer substrate, wherein the radiation-cured coating covers at least a portion of the metallic layer.

8. The optical disc according to claim 7, wherein the radiation-curable composition further comprises an adhesion promoting component that is substantially free of acid functionalities.

9. The optical disc according to claim 7, wherein the metallic layer comprises silver and delamination of the radiation-cured coating occurs over no more than about 15% of the area onto which the coating is applied after the coating is cured and subjected to an environment having a temperature of at least 80° C. and a relative humidity of at least 85% for a period of at least 96 hours.

10. The optical disc according to claim 9, wherein the delamination of the radiation-cured coating after curing occurs over less than about 10% of the area onto which the coating is applied.

11. An optical disc comprising a polymer substrate and a radiation-cured coating provided by curing a radiation-curable coating composition having a pH greater than or equal to 3 and comprising at least one reactive acrylate, wherein the optical disc exhibits shrinkage of no greater than about 9% after curing.

12. The optical disc according to claim 11, wherein the radiation-cured coating exhibits a hardness of from about 2B to about 2H after curing.

13. The optical disc according to claim 12, wherein the optical disc exhibits shrinkage of no greater than about 8% after curing.

14. The optical disc according to claim 11, the optical disc further comprising at least one organic dye as a data recording medium and a metallic reflective layer comprising silver.

15. An optical disc comprising a polymer substrate and a radiation-cured coating provided by curing a radiation-curable coating composition comprising at least one reactive acrylate, wherein the radiation-curable coating is capable of providing a % RAU of less than about 50 after 0.25 sec and greater than about 90 after 5 secs.

16. The optical disc according to claim 15, wherein the radiation-curable coating is capable of providing a % RAU of less than about 50 after 0.5 sec.

17. The optical disc according to claim 15, further comprising at least one organic dye as a data recording medium and a metallic reflective layer comprising silver.

18. A DVD comprising an adhesive composition and two optical discs adhered to one another by the adhesive composition, wherein at least a portion of each disc which contacts the adhesive composition includes a radiation-cured coating provided by curing a radiation-curable coating composition having a pH greater than or equal to 3 and comprising at least one reactive acrylate, wherein the optical disc exhibits shrinkage of no greater than about 9% after curing.

19. The DVD according to claim 18, wherein the portion of each disc which contacts the adhesive composition comprises at least one metal selected from the group consisting of gold, silver and mixtures thereof and the adhesive composition is a cationic adhesive.

20. A radiation-curable coating composition which comprises at least one reactive acrylate, has a pH of greater than about 3, and wherein after curing, exhibits shrinkage of no greater than about 9% and hardness of from about 2B to about 2H after curing.

21. The radiation-curable coating according to claim 20, wherein the radiation-curable coating is capable of providing a % RAU of less than about 50 after 0.25 sec and greater than about 90 after 5 secs.

22. A radiation-curable composition comprising at least one reactive monofunctional acrylate and at least about 50 wt. % of at least one reactive multifunctional acrylate, wherein the pH of the composition is at least 3.0.

23. The radiation-curable composition of claim 22, further comprising an adhesion promoting component that is substantially free of acid functionalities.

24. The radiation-curable composition of claim 22, wherein the composition exhibits a shrinkage of no greater than about 9%.

25. The radiation-curable composition of claim 22, wherein the coating provides a % RAU of less than about 50 after 0.25 sec and greater than about 90 after 5 sec.

26. A radiation-curable composition comprising
 (a) about 0.1 wt. % to about 30 wt. % of at least one acrylate having at least 3 acrylate functionalities,
 (b) about 20 wt. % to about 60 wt. % of at least one difunctional acrylate,
 (c) about 0.1 to about 30 wt. % of at least one monofunctional acrylate,
 (d) about 2 wt. % to about 20 wt. % of at least one high molecular weight multifunctional acrylate, wherein the pH of the composition is at least 3.0.

27. The radiation-curable composition of claim 26, further comprising 0.1 wt. % to about 20 wt. % of an adhesion promoting component that is substantially free of acid functionalities.

28. The radiation-curable composition of claim 27, wherein the at least one difunctional acrylate comprises at least one non-cyclic difunctional acrylate in an amount from about 30 to about 50 wt. % and a cyclic difunctional acrylate in an amount from about 2 wt. % to about 20 wt. %.

29. The radiation-curable composition of claim 28, wherein the at least one acrylate having at least 3 acrylate functionalities is present in an amount of about 15 wt. % to about 25 wt. %, the at least one difunctional acrylate comprises at least one non-cyclic acrylate in an amount from about 35 to about 45 wt. % and a cyclic acrylate in an amount from about 6 wt. % to about 10 wt. %, the at least one monofunctional acrylate is present in an amount of about 4 wt. % to about 15 wt. %, and the at least one monofunctional high molecular weight acrylate is present in an amount of about 4 wt. % to about 14 wt. %.

30. The radiation-curable composition of claim 29, wherein the at least one acrylate having at least 3 acrylate functionalities is present in an amount of about 18 wt. % to about 22 wt. %, the at least one difunctional acrylate comprises at least one non-cyclic acrylate in an amount from about 38 to about 42 wt. % and a cyclic acrylate in an amount from about 6 wt. % to about 10 wt. %, the at least one monofunctional acrylate is present in an amount of about 4 wt. % to about 15 wt. %, the at least one monofunctional high molecular weight acrylate is present in an amount of about 6 wt. % to about 10 wt. %, and the adhesion promoting component is present in an amount of about 0.1 wt. % to about 10 wt. %.

31. The radiation-curable coating of claim 1, further comprising a colorant.

32. The radiation-curable coating of claim 30, wherein the colorant is a dye.

* * * * *